United States Patent [19]

Tribot

[11] Patent Number: 4,829,649
[45] Date of Patent: May 16, 1989

[54] METHOD FOR INSERTING INTER-PHASE INSULATORS IN SLOTS OF STATORS FOR ELECTRIC MACHINES

[75] Inventor: Pierre Tribot, Angouleme, France

[73] Assignee: Moteurs Leroy-Somer, Angouleme, France

[21] Appl. No.: 520,133

[22] Filed: Aug. 3, 1983

[30] Foreign Application Priority Data

Jan. 5, 1983 [FR] France .................................. 83 00091

[51] Int. Cl.⁴ ............................................. H02K 15/10
[52] U.S. Cl. ......................................... 29/596; 29/606; 29/734
[58] Field of Search ................. 29/596, 734, 736, 732, 29/606

[56] References Cited

U.S. PATENT DOCUMENTS 4,276,689 7/1981 Urick et al. ......................... 29/734 X
4,455,743 6/1984 Witwer et al. ..................... 29/734 X Primary Examiner—Carl E. Hall
Attorney, Agent, or Firm—Young & Thompson

[57] ABSTRACT

Inter-phase insulators inserted between the different layers of windings of a stator each comprise two separators joined together by two straps which are engaged within the stator slots. The straps are slidably mounted on the centering-tool and the inter-phase insulators are positioned axially in such a manner that the closed corolla of separators at one end of the straps has to travel over a predetermined distance up to an annular deflecting face of the centering-tool and that the straps project radially from the tool in the vicinity of the position in which the straps are slidably mounted near the opened-out corolla of separators at the other end of the straps.

3 Claims, 8 Drawing Sheets

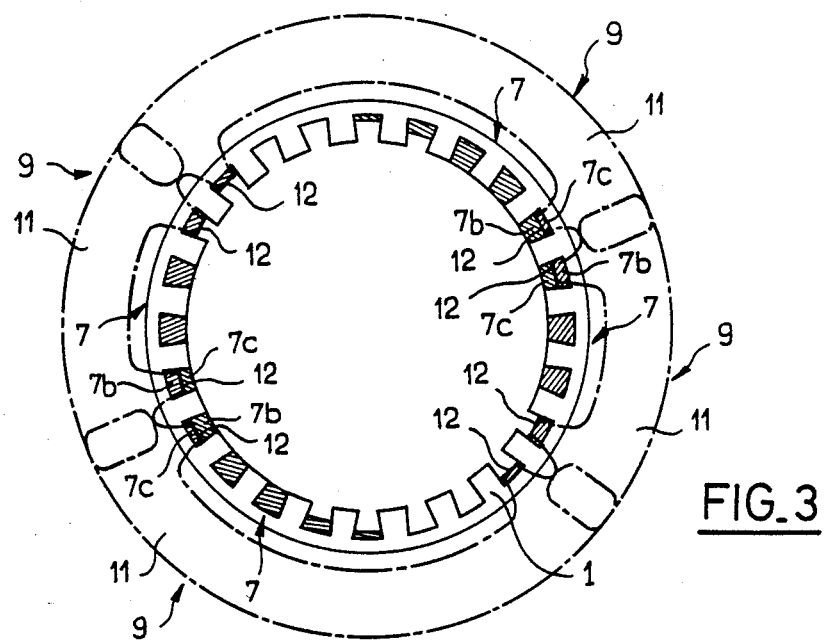
FIG_3
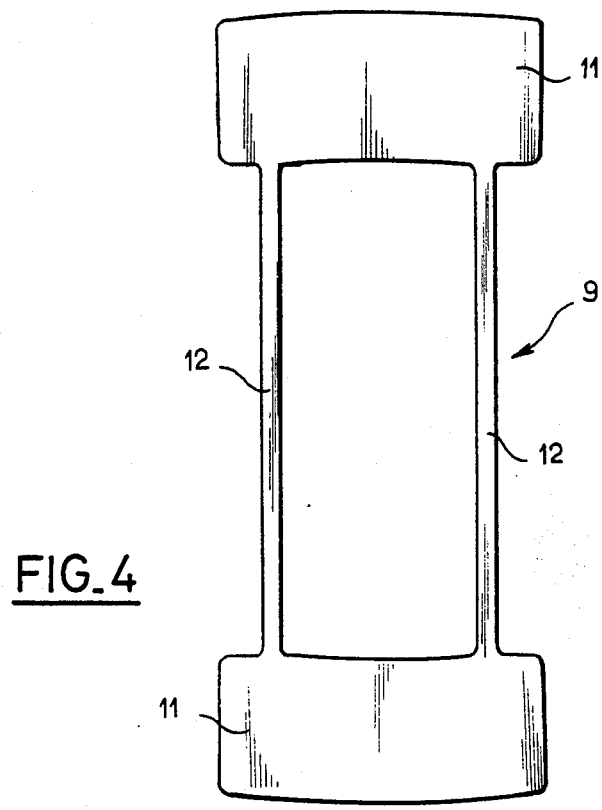
FIG_4

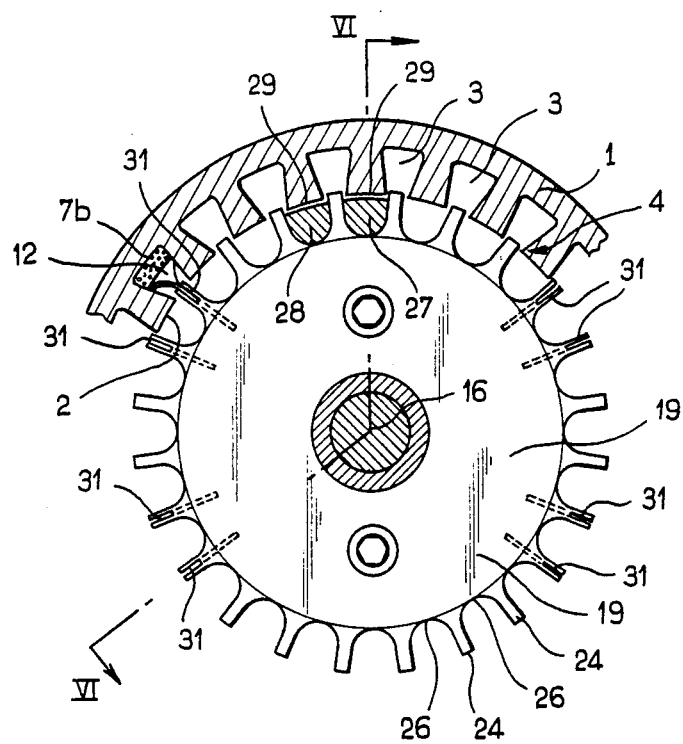
FIG_7
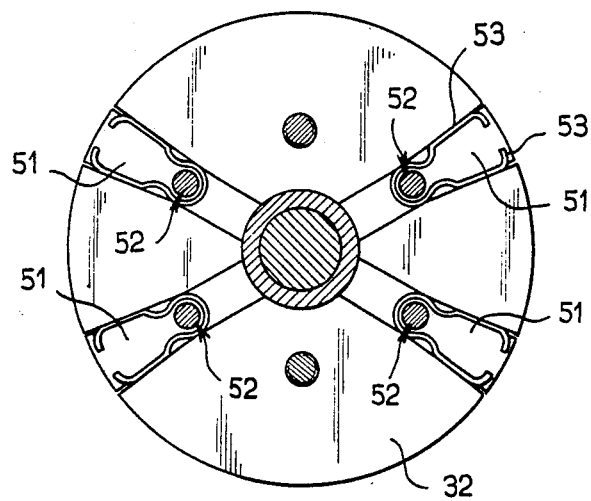
FIG_8

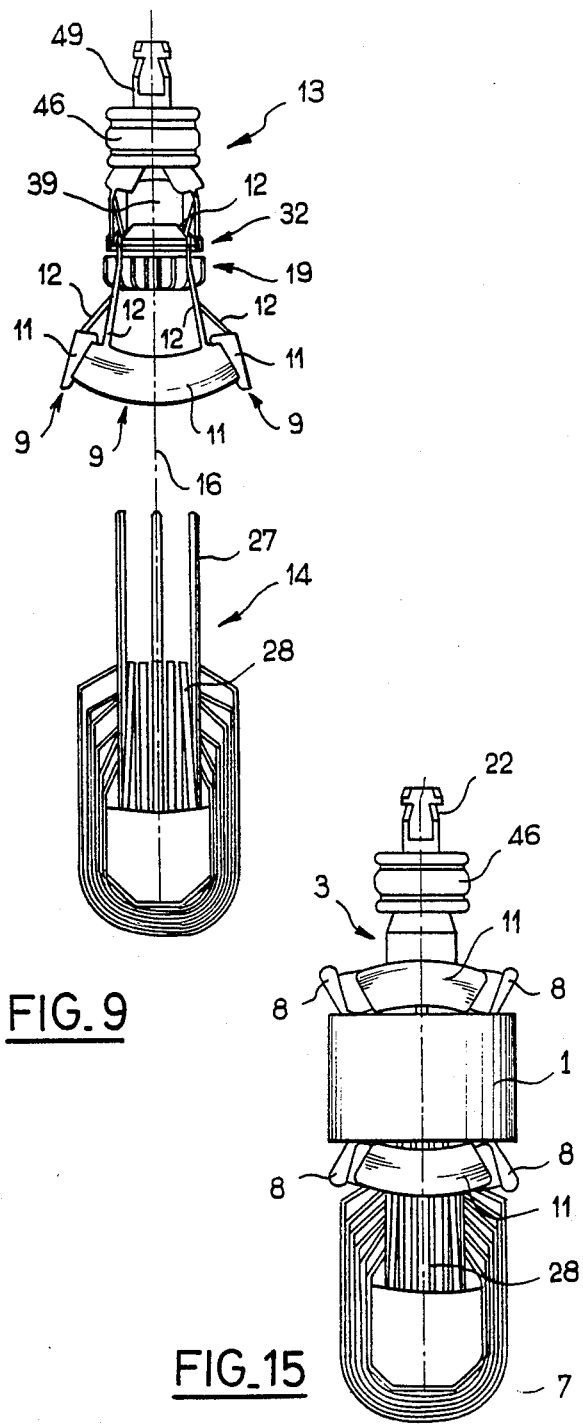
FIG.9
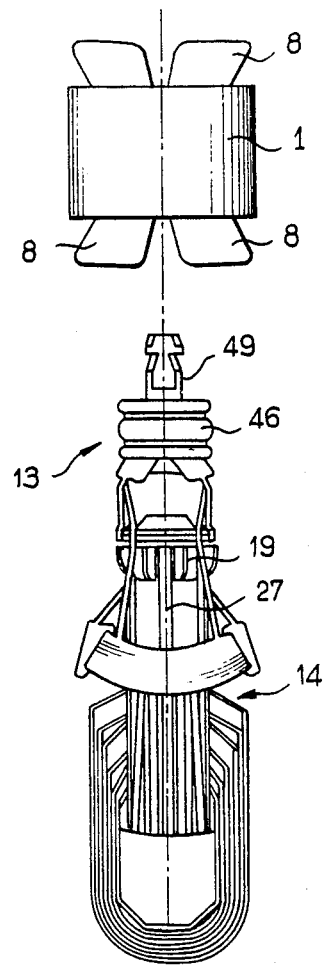
FIG.10
FIG.15
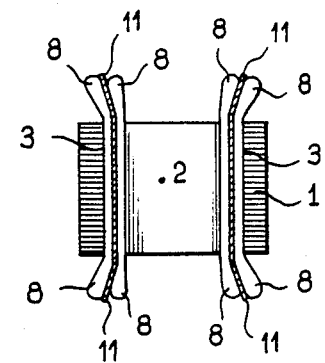
FIG.16

METHOD FOR INSERTING INTER-PHASE INSULATORS IN SLOTS OF STATORS FOR ELECTRIC MACHINES

This invention relates to a method for inserting inter-phase insulators in the slots of stators between the phases of electric machines of the wound-stator type.

The present invention is also concerned with a tool for carrying out this operation.

It is known that, in a motor of the type just mentioned, the stator comprises a stack of sheet-iron laminations traversed by a bore, the axis of which is perpendicular to the planes of the laminations. In the wall of said bore are formed grooves designated hereafter as slots which extend over the entire axial dimension of the stator and are usually spaced at uniform angular intervals. Stator windings have rectangular turns, the two opposite lengths of which are engaged within the slots. Each winding is subdivided into a predetermined number of bundles which occupy one slot. A certain number of slots are occupied only by one bundle forming part of a single winding. The windings partly overlap, however, with the result that a certain number of slots are occupied by two smaller bundles forming part of two different windings. At each annular extremity of the stator, the windings are arranged in much the same manner as flower petals. It will in fact be understood that these petals, or so-called "stator buns" overlap in pairs in the line of extension of the slots occupied by two winding bundles.

The windings are placed in position in concentric layers in the stack of stator laminations, no single slot being occupied by two bundles of the one and the same layer.

In spite of the varnish with which the wires are coated, it is considered useful and even essential to place so-called "inter-phase insulators" between the different layers of windings.

In accordance with one method which is simple but time-consuming in practice, the inter-phase insulators are substantially rectangular sheets of flexible insulating material, or so-called separators, which are disposed in a corolla or flower-petal arrangement and inserted by sliding between the stator buns of the different layers after complete positioning of the windings.

It is also a known practice to make use of strap-type inter-phase insulators each constituted by two separators of the type mentioned above and connected in opposition by means of two bands or "straps" which are intended to be engaged longitudinally between two winding bundles within two slots each occupied by two bundles.

Positioning of the inter-phase insulators is thus stabilized but these latter must be fitted while the different winding layers are being placed in position and not afterwards.

There already exists a known machine provided with a centering-tool and a coaxial insertion tool unit designed to ensure a certain degree of automation in the positioning of windings and inter-phase insulators in the stack of stator laminations. The centering-tool comprises a vertical axial shaft on which are fixed at a distance from each other an upper nut and a lower nut, the latter being located at the free end of the tool.

The nuts have a maximum diameter which is slightly larger than the diameter of the bore formed in the stack of sheet-iron stator laminations and are both provided with notches located at intervals on their periphery in order to be located opposite to each separation between two slots of the stack of laminations during insertion of the windings. The notches are separated from each other by teeth which penetrate to a slight extent into the slots of the stack of laminations in order to position this latter angularly.

The insertion tool unit comprises prongs which are directed axially towards the centering-tool and placed in a cylindrical array. The profile of each prong corresponds to that of the notches of the nuts.

The method employed in this machine will now be explained hereafter.

At the outset, the centering-tool is withdrawn from the insertion tool and the stack of stator laminations has not yet been brought either onto the centering-tool or onto the insertion unit.

After preforming in accordance with known practice, the windings of one layer are placed in position within the prongs in such a manner as to ensure that one of the zones which is intended to form a stator bun is located within the cylindrical space delimited by all the prongs whilst each preformed bundle passes out of the cylindrical space through a respective gap between two prongs. Said gap is chosen so as to be subsequently located opposite to the slot to be occupied by the bundle within the stack of stator laminations.

The centering-tool is then engaged within the insertion tool unit until at least a certain number of prongs are engaged within the notches of the two nuts.

It is assumed that the stack of stator laminations is already provided with the first layer of windings and that it is therefore necessary to position strap-type inter-phase insulators in order to separate the first layer from the second layer of windings. To this end, each strap of each inter-phase insulator is tightly inserted between one of the fixed prongs and the notch occupied by this latter in the nut located farthest away from the end of the centering-tool. One of the separators is thus positioned directly above said nut whilst the other separator which is suspended from the end of the straps is in the vicinity of the nut located at the end of the centering-tool.

The stack of stator laminations is then moved downwards towards the insertion tool unit to a position in which said stack surrounds the upper nut and the adjacent separators of the inter-phase insulators.

The centering-tool is then caused to move upwards to an intermediate position. The upper separators cannot escape radially from the upper nut since this latter is surrounded by the stack of laminations with zero clearance. The upward displacement of the centering-tool is therefore accompanied by the upward motion of the inter-phase insulator. However, said displacement also causes the lower nut to enter the bore of the stack of laminations. Since said lower nut thus obturates the bore, the lower separators must remain beneath the stator and outside the extension of the bore. This theoretically results in the straps coming into position within the appropriate slots of the stack of laminations whilst the upward displacement of the inter-phase insulators together with the centering-tool is interrupted by abutting application of the separators against the lower annular extremity of the stack of laminations. At the same time, the upper separators are withdrawn just outside the bore of the stack of laminations. The upper nut which has a deflecting annular face passes between said upper separators and thus outwardly displaces these latter so as to form a corolla outside the generator-lines of the bore. This has the effect of disengaging each strap from the interstice between prong and notch in which it had hitherto been jammed, and of inserting said strap in the immediately adjacent slot. An insertion nut having a profile which is similar to that of the two preceding nuts is then introduced into the stack of laminations and displaced in sliding motion towards the centering-tool between the insertion prongs. Said nut is accompanied in its displacement by the preformed windings and causes each bundle to be inserted within the slot located opposite to the gap through which it passes out of the cylindrical space between the insertion prongs. In the meantime, the centering-tool moves upwards in order to leave room for the insertion nuts.

There are, however, serious drawbacks attached to this known method.

In the first place, many defects are encountered in the positioning of the straps. Each strap is in fact driven into the slot by the lower nut in the vicinity of the lower separator while, at the same moment, the upper nut is performing the same operation at the other end of the straps. The entire central portion of the straps penetrates into the slot only as a result of a tractive force exerted on both ends. However, this proves insufficient in practice. Sometimes the central portion of a strap either fails to engage within the slot, which is unacceptable, or twists within the slot, thus establishing conditions which are liable to result in failure during the remaining operations.

Furthermore, manual positioning of the straps within the interstices between prongs and notches of the nuts is a long and tedious procedure. In some inserting machines, this is the only time-consuming manual operation which still remains and the machine has to be stopped for a period of time which depends on the skill of the worker.

A further drawback is that the work position involves both difficulty and discomfort, with the result that the same standard of skill cannot be maintained after a few hours. It has been estimated that this operation reduces the production speed by one-half in the case of a machine of advanced design. Moreover, the erratic and uncertain positioning operation just described increases the risks of damage at the time of insertion of the straps within the slots.

Accordingly, it is an object of the invention to provide a method for inserting inter-phase insulators between the different layers of windings of a wound stator for rotating electric machines. Each winding has substantially rectangular turns, the opposite lengths of which are grouped together in bundles inserted within slots extending axially in the wall of a bore which passes through a stack of stator laminations from one side to the other. Said inter-phase insulators each comprise two separators joined together by means of at least two transverse straps which are intended to be engaged within the slots.

The method consists in making use of a centering-tool which is adapted to carry means for attachment to a machine head, means for angular positioning of the stack of stator laminations, and an annular deflecting face. A predetermined number of inter-phase insulators are temporarily attached to the centering-tool by means of their axially disposed straps, the corolla formed by the separators at one end of the straps is opened-out in the radial direction and the corolla formed by the separators at the other end of the straps is radially displaced in a closing movement. The stack of laminations which has already been provided with at least one layer of windings is displaced in an axial sliding movement with respect to the centering-tool in a direction such that the stack of laminations covers the closed corolla and moves towards the opened-out corolla, at least until the stack of laminations engaged with the opened-out corolla draws the separators from the closed corolla which is then opened-out in turn by the deflecting face.

A distinctive feature of the method in accordance with the invention lies in the fact that the straps are slidably mounted on the centering-tool, that the inter-phase insulators are positioned axially in such a manner as to ensure that the closed corolla has to travel over a certain distance up to the annular deflecting face, and that the straps are caused to project radially from the centering-tool in the vicinity of the position in which said straps are slidably mounted near the opened-out corolla.

When the centering-tool is engaged within the stack of stator laminations, the zone of each strap which forms a radial projection necessarily engages in a slot. The front edge of the stator (considered with respect to the direction of displacement) gradually reaches the opened-out corolla whereas the straps have engaged in the slots as the stator advances. The stator then pulls the inter-phase insulators by means of the opened-out corolla. Since the straps are caused to project radially in the vicinity of the position in which they are slidably mounted, the straps necessarily engage within the slots progressively as the stator advances until the closed corolla encounters the annular deflecting face, thus driving the separators radially outwards and therefore completing the engagement of the straps in the slots.

Thus, in order to engage each strap in its slot, a tractive force is no longer exerted on the two ends of the strap as in the known machine but said strap is guided within the slot progressively as the stator advances with respect to the centering-tool.

In accordance with another aspect of the invention, a centering-tool is provided for inserting inter-phase insulators between the different layers of windings of a wound stator for rotating electric machines, each inter-phase insulator being constituted by two separators joined together by means of two transverse straps. Each stator winding has substantially rectangular turns, the opposite lengths of which are grouped together in bundles inserted in slots extending axially in the wall of a bore which passes through a stack of stator laminations from one side to the other, the straps of the inter-phase insulators being necessarily placed within the slots of the stack of laminations. Said centering-tool comprises means for angular positioning of the stator, means for temporarily attaching the straps of the inter-phase insulators to the tool in such a manner that the separators form two corollas, and an annular deflecting face for opening-out one of the corollas by axial traction exerted on the inter-phase insulators.

In accordance with the invention, said centering-tool is distinguished by the fact that the tool comprises in addition a predetermined number of slits disposed substantially in axial planes and having openings located at a distance from the axis of the tool which is close in value to the radius of the bore of the stack of laminations. Said slits are located in relative angular positions corresponding to those of the slots to be fitted with inter-phase insulator straps between each pair of layers of adjacent windings.

It is therefore no longer necessary to carry out the acrobatic and unreliable operation which consists in jamming the insulator-phase insulator straps in the interstice between prongs and notches. It is in fact only necessary to insert them in the slit provided for this purpose. Furthermore, and in contrast to the interstice which has just been mentioned, said slit is located exactly opposite to the corresponding slot, with the result that the strap enters into the slot quite naturally as it passes out of the slit.

Other features of the invention will be more apparent upon consideration of the following description and accompanying drawings, wherein:

FIG. 3 is a view which is similar to FIG. 2 but after positioning of a second layer of windings and the inter-phase insulators which provide a separation between the first and second layers;

FIG. 4 is a plan view of an inter-phase insulator;

FIGS. 7 and 8 are sectional views of the tool, taken along the planes VII—VII and VIII—VIII of FIG. 6;

FIGS. 9, 10, 15 and 16 are diagrammatic views in side elevation showing four steps of the method for positioning of the inter-phase insulators and the windings;

Figure 1:
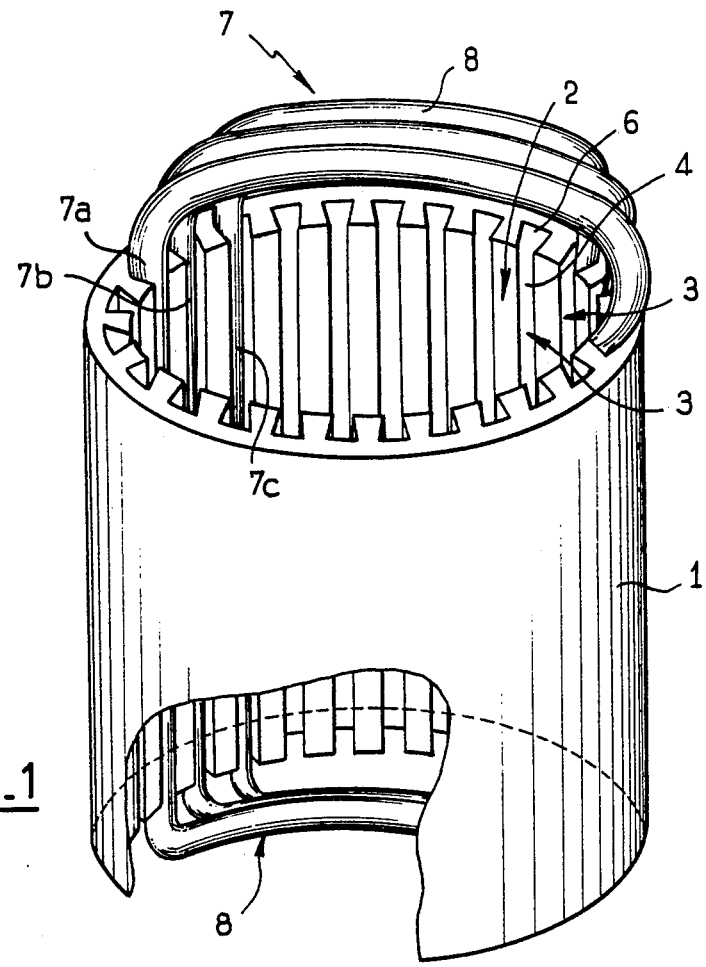
FIG. 1 is a cutaway view in perspective showing a stack of stator laminations for a rotating electric machine and fitted with a winding.
Figure 2:
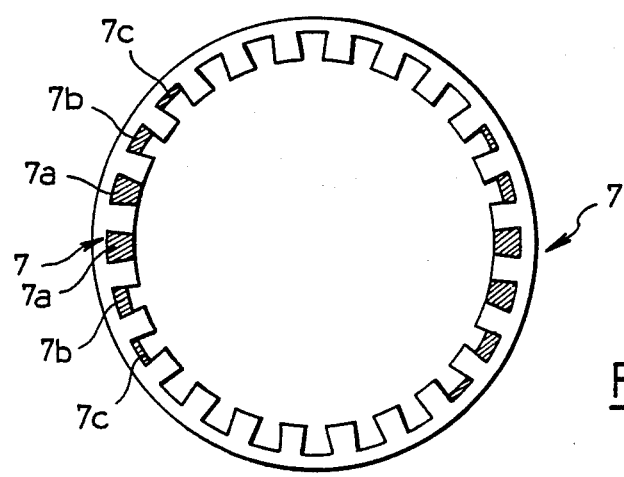
FIG. 2 is a transverse sectional view of the stack of laminations of FIG. 1, said stack being provided with a first layer of two opposite windings.

As shown in FIGS. 1 to 3, the invention is directed to wound stators for rotating electric machines such as asynchronous machines or alternators.

A stator of this type comprises a stack of sheet-iron stator laminations 1 traversed from one end to the other by a bore 2. Axial grooves designated as slots 3 are formed in the internal wall of said bore. The constricted internal opening 4 of each slot is of smaller width than the bottom wall 6 of said opening.

There is shown diagrammatically in FIG. 1 a preformed winding 7 having substantially rectangular turns, the opposite lengths of which are assembled together in six bundles, each bundle being engaged within a slot 3. In the example shown in the drawings, the two end bundles 7a completely fill their slots whereas the two central bundles 7c occupy only one-third of their slots and the other two bundles 7b fill only one-half of their slots.

Outside the slots 3 on each side of the stack of laminations 1, the bundles 7a, 7b, 7c are joined together and form a so-called "stator bun" 8 on each side of the stator.

The situation illustrated in FIG. 1 is in fact never realized in practice since the windings such as the winding 7 are usually positioned in pairs.

In FIG. 2, two opposite windings 7 constituting a first layer of windings have been placed in position.

In FIG. 3, two other opposite windings 7 constituting a second layer have been placed in position. It is apparent that a certain number of bundles 7b of the second layer are in the same slot as a bundle 7c of the first layer and that a certain number of bundles 7c of the second layer are in the same slot as a bundle 7b of the first layer.

Between the two layers of windings are inserted inter-phase insulators 9 (as shown in FIG. 4) comprising two substantially rectangular insulating sheets or separators 11 joined together by means of two transverse bands designated as straps 12. When the electric machine is in service, the separators 11 are adjacent to the stator buns 8 whilst the straps 12 are inserted in slots 3 occupied by two bundles 7b, 7c and more especially between these latter which necessarily belong to different layers.

There is shown diagrammatically in FIG. 3 the arrangement of the inter-phase insulators 9, provision being made for four insulators between each pair of adjacent layers. To this end, one strap 12 has been inserted in predetermined slots 3 prior to positioning of the second layer, said slots having been chosen in known manner from those which are to be occupied by two bundles 7b and 7c when the stator is finally completed.

In the case of the three-phase dipole stator which is illustrated, it is found necessary to employ two types of inter-phase insulator 9 which differ from each other in the length of the separators 11 and the distance between the straps 12. Once the insulator is in position as shown in FIG. 3, it is apparent that the separators 11 form at each annular extremity of the stack of laminations a corolla having the effect of insulating the stator buns 8 of the first layer with respect to those of the second layer.

In the example shown in the drawings, it remains necessary to place in position a third layer which is similar to the two previous layers. All the slots (namely a total of twenty-four) will then be filled with a bundle 7a or with a pair of bundles 7b and 7c. Prior to positioning of the third layer, inter-phase insulators will have been placed within slots 3. These slots have the same relative arrangement as the slots 3 which have been fitted with the inter-phase insulators 9 shown in FIG. 3 but are all displaced together through an angle of 120° with respect to these latter.

The eight straps 12 of the inter-phase insulator 9 will be arranged in the manner shown in FIG. 3, subject to a difference in angular position.

The machine employed for inserting the windings 7 and the inter-phase insulators 9 within the slots 3 of the stack of stator laminations 1 is equipped with a centering-tool 13 and an insertion unit 14 which have a common vertical axis 16 in service (as shown in FIG. 9).

Figure 5:
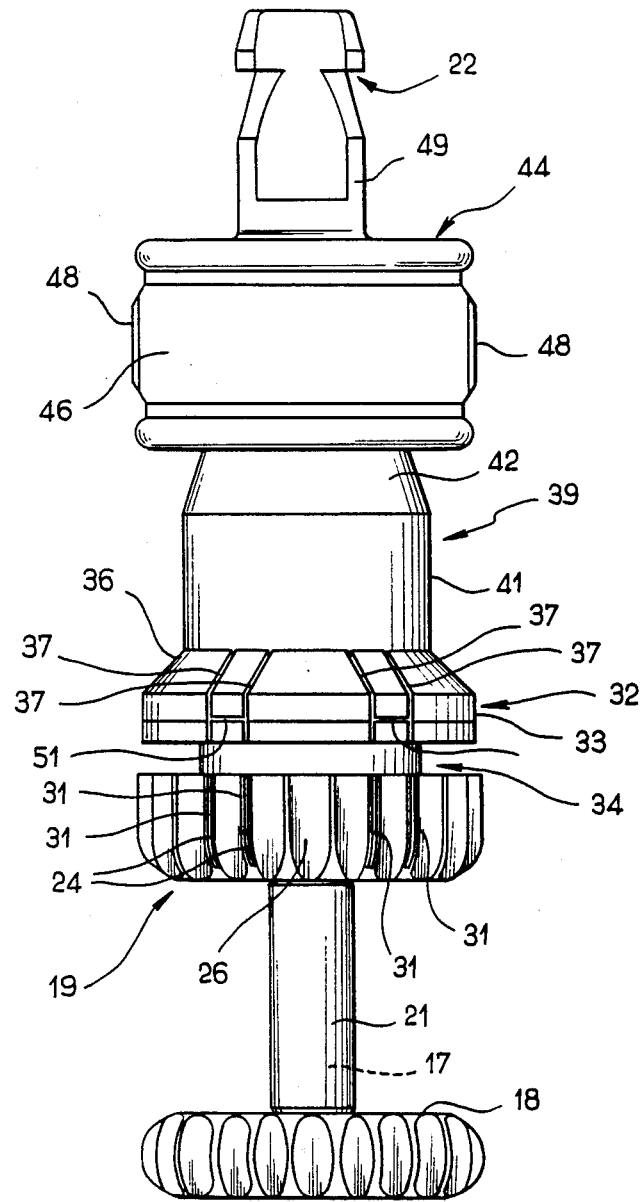
FIG. 5 is a view in side elevation showing the centering-tool.
Figure 6:
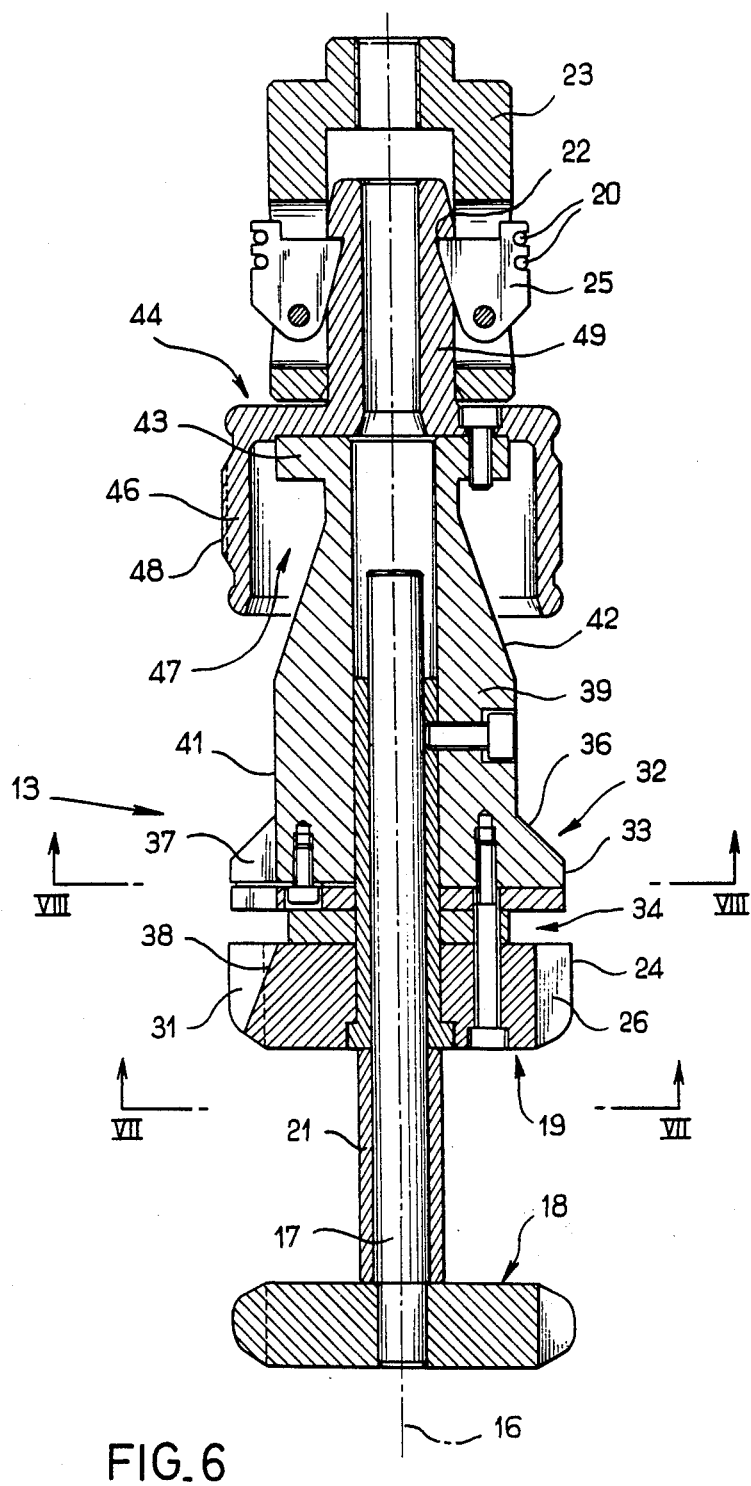
FIG. 6 is an axial sectional view showing the tool of FIG. 5 and taken along the plane VI—VI of FIG. 7.

As illustrated in FIGS. 5 and 6, the centering-tool 13 comprises a shaft 17 having an axis which coincides with the axis 16, there being fixed on said shaft two nuts 18 and 19 separated by a tubular spacer member 21 which surrounds the shaft 17.

The nut 18 is located at the free end of the shaft 17, namely the end which is directed towards the insertion unit 14 (downwards under service conditions). The nut 19 is nearer the upper end of the tool 13 which is provided with a locking recess 22 for attachment of said upper end to a sleeve 23 carried by a vertically movable head of the machine. The sleeve 23 is adapted to carry pivotally-mounted catches 25 which are urged towards the locking recess 22 by means of elastic bands 20.

The tool 13 can thus be positioned by snap-action engagement and disassembled by means of a tool device (not shown) which is capable of engaging and outwardly displacing the catches 25.

As shown in FIG. 7, the nut 19 is provided on its periphery with teeth 24 separated by notches 26. The number of teeth 24 is equal to the number of slots 3 of the stack of laminations 1. The circumferential dimension of the teeth 24 at the ends of these latter enables them to engage within the constricted openings 4 of the slots 3. The diameter of the nut 19 at the tips of the teeth 24 is slightly larger than that of the bore 2 of the stack of laminations 1. In consequence, when this latter is engaged around the nut 19, the teeth 24 are engaged within the slots 3 just sufficiently to effect the angular positioning of the stack of laminations 1 with respect to the centering-tool 13.

The notches 26 have a substantially semicircular profile corresponding to that of the prongs 27, 28 (as shown in FIG. 9) which form part of the insertion unit 14 and are directed axially towards the centering-tool 13. The prongs 27 are stationary and project towards the centering-tool 13 with respect to the prongs 28 when these latter are in the inactive position. In fact, the prongs 28 are attached to an insertion nut (not shown) which is capable of axial displacement towards the stack of laminations 1 and of engagement within this latter in known manner in order to insert the windings 7.

In the example shown in the drawings, provision is made for a total of twenty-four prongs 27, 28 arranged in a cylinder so that each prong 27 or 28 is capable of engaging within a respective notch 26 of the nut 19 when the centering-tool 13 undergoes a displacement towards the insertion unit 14 or when the insertion nut of the unit 14 moves towards the centering-tool 13.

The bottom nut 18 of the tool 13 has the same profile of teeth separated by notches as the nut 19. Furthermore, the teeth and the notches of the nut 18 are placed in axial alignment with the teeth 24 and the notches 26 of the nut 19.

There are shown diagrammatically in FIG. 7 two prongs 27 and 28 which are engaged in the nut 19 when this latter is placed within the bore 2 of the stack of laminations 1. The prongs 27, 28 are limited on their external face by a cylinder sector 29 having the same diameter as the bore 2 (with due allowance for clearances).

In accordance with the invention, slits 31 are formed in a certain number of the teeth 24 of the nut 19 (as shown in FIGS. 5 to 7) and said slits extend in a plane which passes through the axis 16. The slits 31 have their openings at the ends of the teeth 24. Said teeth 24 provided with slits are placed with respect to each other in the same manner as the slots 3 which receive the straps 12 of a set of inter-phase insulators which form a separation between two layers of windings (as shown in FIG. 3). Thus in the example shown in FIG. 7, the slits 31 are eight in number and, on condition that the stack of laminations 1 is angularly positioned in a suitable manner with respect to the centering-tool 13, all the slits 31 can be placed simultaneously opposite to a slot 3 to be provided with straps 12 at a predetermined stage of insertion of the windings.

On that side of the nut 19 which is remote from the nut 18, the centering-tool 13 is provided with an annular collar 32 having a cylindrical external wall 33 which has the same diameter as the bore 2 of the stack 1, subject to sliding clearances. The annular collar 32 is coaxial with the nuts 18 and 19 and is separated from the nut 19 by a channel 34 having a greater depth in the radial direction than the notches 26 and the slits 31 and having an axial length of approximately 1 centimeter. On the side remote from the nut 19, the annular collar 32 is limited by a convex frusto-conical wall 36 which decreases in diameter from the wall 33 and constitutes an annular deflecting face as will be seen hereafter.

In accordance with a distinctive feature of the invention, the annular collar 32 is provided with slits 37 located in the same planes as the slits 31 of the nut 19. Thus each slit 31 is extended on the opposite side of the channel 34 by a corresponding slit 37 which has an opening in the walls 33 and 36.

The depth of the slits 37 with respect to the wall 33 is greater than the width of the straps 12. The bottom portions or roots of all the slits 37 are located on an ideal cylinder having an axis 16. The roots 38 of the slits 31 are located on an ideal cone having an axis which coincides with the axis 16 and having an apex angle of 20°. Thus the depth of the slits 31 at the ends nearest the slits 37 is substantially the same as the depth of said slits 37. At their opposite ends, the slits 31 have a depth which is smaller than the width of the straps 12. It will thus be seen from FIGS. 11–13, that the strap is in contact with bottom 38 of slit 31 in a region of slit 31 which is remote from the clearance provided by channel 34, slit 31 in this region having a depth which is smaller than the width of the strap, and that the strap is also in contact with bottom 38 of slit 31 in a second region of slit 31 which is adjacent the clearance provided by channel 34, the slit having in that second region a depth which is greater than the width of the strap.

The annular collar 32 is carried by a body 39 ensleeved on the shaft 17 and having a cylindrical wall 41 which extends between the wall 36 and a concave frusto-conical wall 42, with the result that said body 39 decreases in diameter away from the annular flange 32.

At the end remote from the annular collar 32, the body 39 has an annular flange 43 against which is screwed the base of a socket 44 having a side wall or skirt 46 which is directed towards the annular collar 32 and extends to a predetermined radial distance from the frusto-conical wall 42 in order to form between them a space 47 which opens towards the slits 37 and 31.

The external face of the skirt 46 has the same diameter (subject to sliding clearances) as the bore 2 of the stack 1 and is provided with splines 48 which are intended to penetrate into the slots 3 in order to achieve enhanced accuracy of angular positioning of the stack of laminations 1 with respect to the nuts 18 and 19. The stack of laminations 1 has been pre-positioned by known means not shown in the drawings. The base of the skirt 44 is adapted to carry an end-piece 49 which extends in the opposite direction with respect to the skirt 46, the groove 22 being formed in said end-piece.

As shown in FIGS. 5 and 8, the slits 37 communicate with each other in pairs via radial slits 51 in each of which is mounted a spring-steel wire 52 having two arms 53 resiliently applied against the opposite wall of the slits 37 with respect to the slit 51. At the end which is directed towards the exterior of the slit 51, the arms 53 are bent-back towards each other while being in spaced relation.

Consideration will now be given to the procedure adopted for the use of the centering-tool described in the foregoing and the following explanations will include the procedure involved in the method provided by the invention.

As shown in FIG. 9, when the centering-tool 13 is withdrawn from the insertion unit 14, the equipped with a series of inter-phase insulators 9 of suitable design for providing a complete separation between two layers of windings 7, namely four inter-phase insulators in the example considered thus far.

To this end, the centering-tool is preferably withdrawn from the machine. This is possible in accordance with the invention, in which the inter-phase insulators are positioned independently of the insertion prongs 27. In practice, provision is preferably made for a plurality of centering-tools 13 which a person equips with inter-phase insulators outside the machine. Another person operating the machine need only position a centering-tool 13 equipped with inter-phase insulators when it proves necessary to do so, thus practically dispensing with all stoppages of the machine in order to position the inter-phase insulators.

In order to equip the centering-tool with its inter-phase insulators, a strap 12 of one of the inter-phase insulators 9 is introduced into each pair of aligned slits 31, 37, the inter-phase insulators 9 of different dimensions being placed in the relative position which they are intended to occupy within the completed stator.

Figure 11:
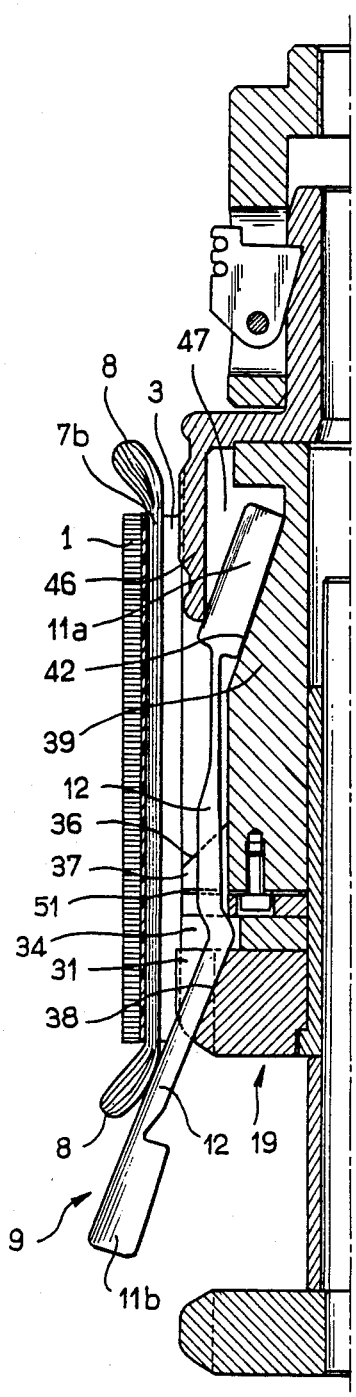
FIGS. 11 to 14 are axial sectional half-views showing in detail the transition from the step of FIG. 10 to the step of FIG. 15.

FIG. 11 shows how an inter-phase insulator 9 is initially positioned on the centering-tool 13. One of the separators 11 is engaged within the space 47. The strap 12 is engaged within the slit 37 and maintained therein by the spring 51. The strap 12 is also engaged against the bottom or trough 38 of the slit 31. Taking into account the distinctive character of said trough, the strap 12 forms on the one hand an undulation within the channel 34 in order to change from the vertical position to a position in which it is inclined at an angle of 20°. On the other hand, said strap 12 projects radially from the nut 19 in the vicinity of that end of the slit 31 which is remote from the annular collar 32.

Thus, as shown in FIG. 9, the upper separators 11 form a closed corolla 11a beneath the skirt 46 whereas, by virtue of the direction given to the straps 12 by the troughs 38 of the slits 31, the lower separators 11 form an opened-out corolla 11b, the diameter of which is larger than that of the bore 2 of the stack 1.

Furthermore, taking account in particular of the presence of the springs 51, the arms 52 of which produce their maximum force in the vicinity of the openings of the slits 37, the straps 12 may more easily slide within the slits 37, the straps 12 may more easily of the tool 13 than they may slide out of slits 31 and 37.

It will be noted that, in accordance with a particular feature of the invention, the separators 11a engaged beneath the skirt 46 are initially at an appreciable axial distance from the face 36 corresponding, for example, to approximately one-half the length of the straps 12.

As shown in FIG. 10, the centering-tool 13 which has thus been equipped is mounted on the machine and moved in the axial direction towards the insertion unit 14 until the fixed prongs 27 are engaged in a certain number of notches 26 of the two nuts 18 and 19 and are abuttingly applied against the base of the annular collar 32.

The stack of stator laminations 1 which has already been provided with a layer of windings 7 is then moved axially into position around the centering-tool 13 in order to ensure that it engages first around the skirt 46 (therefore around the closed corolla 11a), then moves towards the opened-out lower corolla 11b.

FIGS. 11 to 14 show four stages of advance of the stack of laminations 1.

In FIG. 11, the stack 1 has just engaged around the slits 31. Since a slot 3 for receiving a strap 12 is angularly positioned opposite to each slit 31 and since one strap 12 projects from each slit 31 in an axial plane, one strap 12 engages directly within each slot 3 to be fitted with straps 12. The schematic presentation of FIG. 7 shows how a strap 12 which passes out of a slit 31 is guided directly into the oppositely-facing slot 3.

Figure 12:
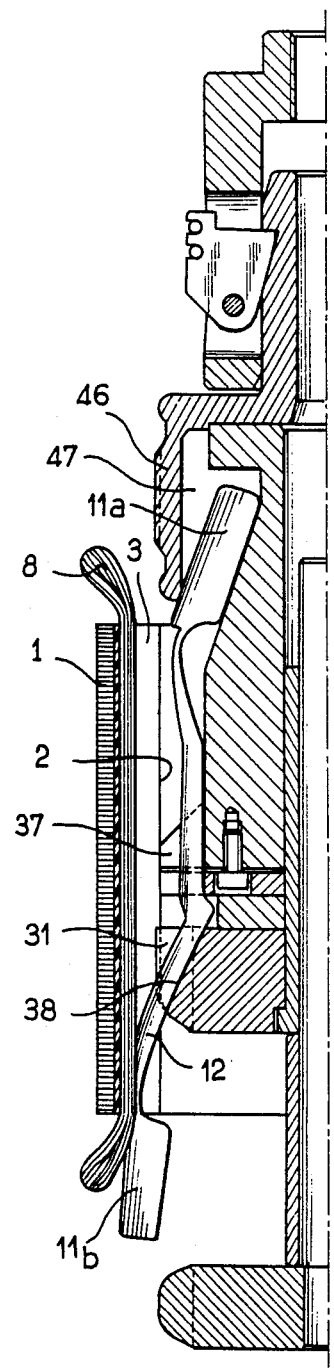

In the situation shown in FIG. 12, the bottom edge of the stack 1 has reached the corolla 11b. Taking into account the situation shown in FIG. 11, the strap 12 has engaged within the slot 3 progressively as the stack 1 has advanced and the corolla 11b is therefore located outside the bore 2 of the stack 1.

Figure 13:
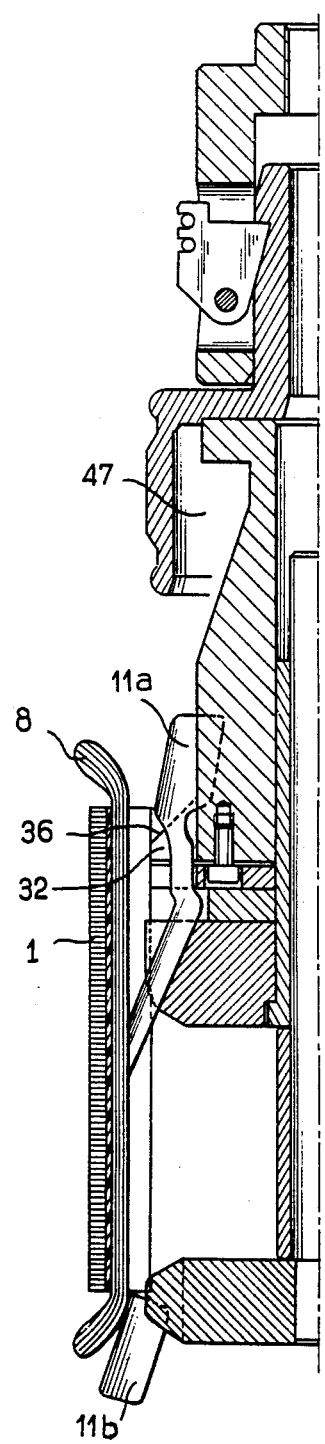

As shown in FIG. 13, the separations between the slots 3 are therefore applied against the separators 11b and exert a tractive force on the inter-phase insulators 9 whilst the straps 12 slide within the slits 31 and 37 and the upper separators 11a pass out of the space 47.

As this advance takes place, so the slit 31 continuously constrains the strap 12 to move out and to project radially from the nut 19, with the result that the strap 12 is directly inserted in the slot as the stator advances. It will thus be seen that the present invention provides a method of inserting a strap 12 of a phase insulator 9 into a stator slot 3 provided along a bore of a stack of laminations 1 during manufacturing of a stator of a dynamo-electric machine, using an insulation insertion tool 13 having a radial slit 31 whose trough or bottom 38 is inclined with respect to the axis of the bore and which has a channel or clearance space 34 axially beyond that end of bottom 38 which is closer to the axis of the bore. The method comprises placing the strap 12 in contact with bottom 38 of slit 31, thereby to produce an undulation in strap 12 outside slit 31 and in clearance space 34, and causing relative motion between the strap 12 and bottom 38 while the strap 12 and bottom 38 are in contact with each other, in a direction such that bottom 38 urges successive portions of the strap 12 radially outwardly into stator slot 3.

In the situation shown in FIG. 13, the upper corolla 11a has reached the deflecting face 36 of the annular collar 32 whilst, in addition, one half of the length of the straps 12 has engaged within the slots 3.

Figure 14:
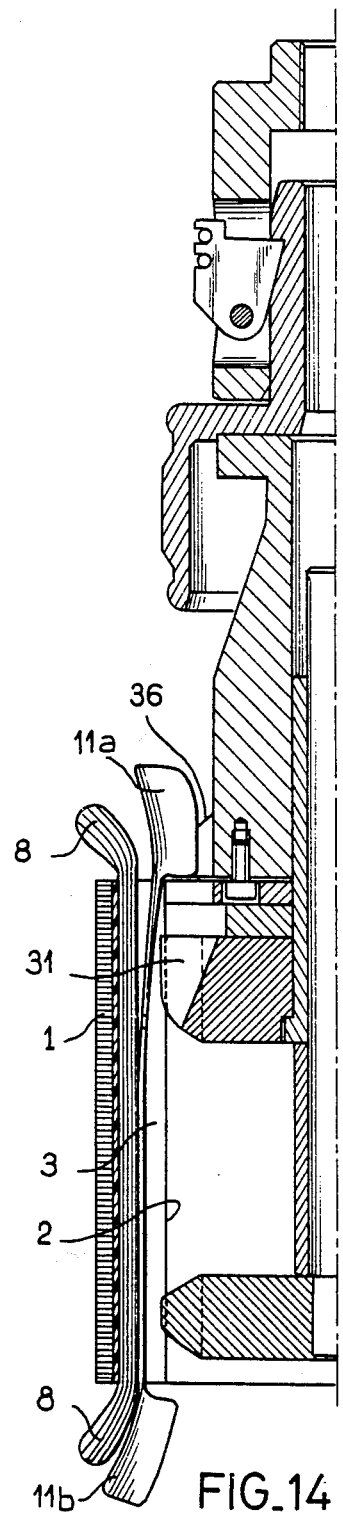

The remainder of the movement up to the end position shown in FIG. 14 will continue to introduce the strap 12 in the manner which has been noted in the foregoing but will at the same time produce a radial opening-out of the upper corolla 11a by applying this latter against the deflecting wall 36.

FIG. 15 shows the assembly at this stage, the windings already mounted on the stack 1 being shown in axial cross-section.

It is then possible to cause the movable prongs 28 and the supporting nut to move upwards into the stack 1 while withdrawing the centering-tool 13. The preformed windings 7 of the second layer have previously been arranged between the prongs 28 in a known manner.

After various operations (such as packing within the slots, separating the newly-formed stator buns 8, and so on), it is only necessary to rotate the stack 1 through an angle of 120° or 240° about its axis and to repeat all the operations described in the foregoing in order to install the third layer of windings.

As can readily be understood, the invention is not limited to the examples described with reference to the accompanying drawings. These examples may be extended to include many alternative arrangements without thereby departing either from the scope or the spirit of the invention.

In particular, the invention has been described in its preferred form in which it is integrated with a method and equipment for the insertion of windings but it is clearly apparent that the positioning of the inter-phase phase insulators could take place at a separate station by making use of a specific centering-tool.

What is claimed is:

1. A method of inserting a strap of a phase insulator into a stator slot provided along a bore of a stack of laminations during manufacturing of a stator of a dynamoelectric machine, using an insulation insertion tool having a radial slit whose bottom is inclined with respect to the axis of the bore and which has a clearance space axially beyond that end of said bottom which is closer to the axis of the bore, the method comprising placing the strap in contact with said bottom of the slit, thereby to produce an undulation in said strap outside said slit and in said clearance space, and causing relative motion between the strap and said bottom while the strap and said bottom are in contact with each other, in a direction such that said bottom urges successive portions of the strap radially outwardly into said stator slot.

2. A method according to claim 1, in which the strap is in contact with the bottom of the slit in a region of the slit which is remote from said clearance, said slit having in said region a depth which is smaller than the width of the strap.

3. A method according to claim 2, in which the strap is also in contact with the bottom of the slit in a second region of the slit which is adjacent said clearance, said slit having in said second region a depth which is greater than the width of the strap.

* * * * *